R. G. MEWBORNE.
METHOD FOR CONCENTRATING NICOTIN SOLUTIONS.
APPLICATION FILED JULY 8, 1912.
1,146,014.
Patented July 13, 1915.
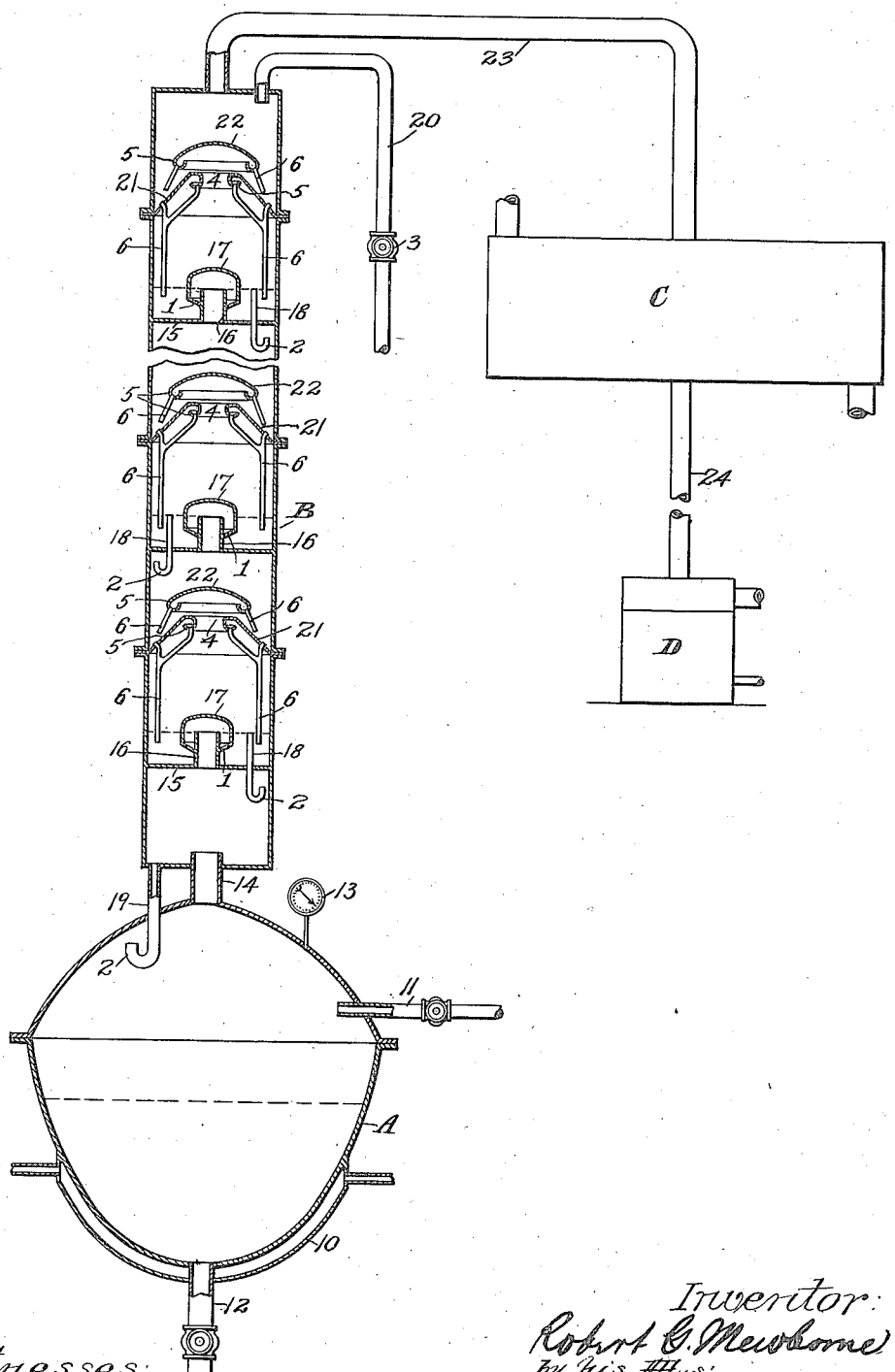

UNITED STATES PATENT OFFICE.

ROBERT G. MEWBORNE, OF LOUISVILLE, KENTUCKY, ASSIGNOR TO THE KENTUCKY TOBACCO PRODUCT COMPANY, A CORPORATION OF NEW JERSEY.

METHOD FOR CONCENTRATING NICOTIN SOLUTIONS.

1,146,014.  Specification of Letters Patent.  Patented July 13, 1915.

Application filed July 8, 1912. Serial No. 708,161.

*To all whom it may concern:*

Be it known that I, ROBERT GRAHAM MEWBORNE, a citizen of the United States, residing at Louisville, county of Jefferson, and State of Kentucky, have invented certain new and useful Improvements in Methods for Concentrating Nicotin Solutions, fully described and represented in the following specification and the accompanying drawings, forming a part of the same.

The object of the present invention is to provide an efficient process for concentrating nicotin solutions and tobacco extracts containing free nicotin by distilling off the water, and especially to avoid loss of nicotin by its being carried away with the vapors of distillation, and to make unnecessary the use of acid which is sometimes objectionable.

I have discovered that the tendency of nicotin to volatilize is greatly reduced by employing in the distillation process a high vacuum, so that it is possible to concentrate such nicotin solutions with very little nicotin passing off from the solution. The vacuum used will preferably be the highest that can be maintained practically, there being a marked decrease in the nicotin content of the vapors as the vacuum is increased. The vacuum in the still should be above 27 inches of mercury for good results, if no means be used for recovering the nicotin passing off with the vapors, although it is practical to use a somewhat lower vacuum, but for the best results under such conditions the vacuum should be 28 inches or even more as it may be found practical to maintain such vacuum. The temperature of distillation in such case, therefore, will preferably be from about 115° F. downward according to the vacuum employed. Some nicotin will pass off with the vapors, however, at the highest vacuum that can be maintained, and for recovering this, as well as for securing a more efficient and economical process, I preferably employ in my process and apparatus some suitable means for removing from the vapors their nicotin content and returning this to the still. This is preferably done by passing the vapors through water which washes out the nicotin content and condenses any nicotin vapors, and wash water additional to the water condensed from the vapors is preferably used, the nicotin content with the wash water being returned to the still, but the desired result may be secured otherwise. With the nicotin content thus recovered from the vapors, I still preferably use the highest practical vacuum to reduce as far as possible the nicotin passing off from the still with the vapors, but this is not so important as when the still is used without such means for treating the vapors, and any suitable lower vacuum may be employed within those features of my invention that include such treatment.

In the accompanying drawing I have shown for purpose of illustration, an apparatus of the best form now known to me for carrying out the process of the invention, and this apparatus will now be described in detail in connection with the accompanying drawing, and the features forming the invention then specifically pointed out in the claims.

Referring to the drawing, which is a diagrammatic sectional elevation of the apparatus, A is the still, B a return tower in which the nicotin content of the vapors is removed and returned to the still, C is a surface condenser to which the vapors pass from the return tower, and D a vacuum pump of any type suitable for drawing off the vapors through the condenser and maintaining the high vacuum required. If preferred, a barometric condenser may be used to maintain the vacuum. The still is shown as heated at the bottom by a steam jacket 10, which preferably incloses only the lower part of the still as shown, but may be heated in any suitable manner, and the still has at the top and bottom, respectively, the valve controlled pipes 11 for admitting the dilute nicotin solution to be concentrated and discharge pipe 12 for the concentrated nicotin, and has a suitable vacuum gage 13.

The return tower B receives the vapors from the still through vertical pipe 14 and is divided by partitions 15 into a series of chambers one above the other connected by vapor pipes 16 extending above the partitions 15 to form, in connection with the shell of the tower, a receptacle in which is maintained a layer of liquid formed by condensation of the vapors, and, in the construction shown, by water added at the top of the tower. The vapor pipes 16 are covered by hoods 17 so that the vapor is forced to pass downward and through small holes 1 below the level of the liquid above the partitions, so as to bubble up through the liquid. The liquid in the compartments above partition 15 is automatically changed by gravity flow from the top compartment through the succeeding compartments by overflow pipes 18 extending upward through the partitions 15 to the level of the top of the vapor pipes 16, and sealed at their lower ends to prevent the upward passage of vapor through the pipes, as by the bends 2, as shown, which form sealing traps on the pipes. From the bottom compartment of the tower, the liquid passes back to the still through pipe 19 shown as sealed by a similar bend 2. It will be understood that the vapor pressure within hoods 17 will prevent the liquid overflowing through pipes 16.

As stated above, the tower may be used without the addition of water, the vapors being washed and the nicotin content returned to the still by the liquid condensed from the vapors and collected in the compartments above partitions 15, and any suitable means may be used for securing the vapor condensation desired in the tower. Preferably, however, and as shown, pure water will be admitted at the top of the tower through pipe 20, controlled by cock 3, either with or without a suitable spraying device for distributing the water over the top of the tower, this water admitted through pipe 20 passing downward through the tower and acting to condense the vapors and carry the water of condensation and nicotin content back to the still.

I preferably provide in each compartment of the tower, also, suitable means for preventing the liquid being carried off by the flow of vapors, this means consisting, in the form shown, of suitable spray catchers, formed by inclined partitions 21, having central openings 4 for the vapors, and curved or inclined hoods 22 above the openings 4. The vapors and any liquid carried thereby strike the under sides of partitions 21 and hoods 22 and are deflected, so that the liquid separated therefrom is guided into troughs 5, formed at the inner edges of the partitions and hoods, from which the liquid flows downward through pipes 6 in the outer part of the tower, the pipes 6 extending downward from the partitions 21 and carrying the liquid through the next lower vapor compartment being sealed to prevent the passage of vapor upward through the pipes, this result being secured in the construction shown by extending these pipes 6 downward into the liquid contained in the compartments above partitions 15.

The vapors that are not condensed in the return tower finally pass, with their nicotin content removed, from the top of the tower to the condenser C, through pipes 23, and the condenser discharges to vacuum pump B, through pipe 24, or the vapors may pass directly to the vacuum pump or to a suitable barometric condenser, if desired.

It will be understood that the invention is not limited to the particular form of apparatus shown, but that the still and means for treating the vapors may be of any other construction suitable for carrying out the process defined by the claims.

What I claim is:

1. The improvement in processes of concentrating solutions or extracts containing free nicotin, which consists in distilling the water off in a chamber maintained under a high vacuum and the corresponding low temperature to the desired point of concentration.

2. The improvement in processes of concentrating solutions or extracts containing free nicotin, which consists in distilling the water off in a chamber maintained under a high vacuum and the corresponding low temperature to the desired point of concentration and removing the nicotin content from the vapors and returning it to the still.

3. The improvement in processes of concentrating solutions or extracts containing free nicotin, which consists in distilling the water off in a chamber maintained under a high vacuum and the corresponding low temperature to the desired point of concentration, passing the vapors through water for condensing and removing any nicotin carried off with the vapors, and returning the nicotin to the still.

4. The improvement in processes of concentrating solutions or extracts containing free nicotin, which consists in distilling the water off in a chamber maintained under a vacuum to the desired point of concentration, passing the vapors through water for condensing and removing any nicotin carried off with the vapors, and returning the nicotin to the still.

In testimony whereof, I have hereunto set my hand, in the presence of two subscribing witnesses.

ROBERT G. MEWBORNE.

Witnesses:
C. J. SAWYER,
J. A. GRAVES.